United States Patent
Zelinger

[19]

[11] Patent Number: 6,112,698

[45] Date of Patent: Sep. 5, 2000

[54] WEIGHTED METAL PET BOWL

[75] Inventor: Alan Zelinger, Monsey, N.Y.

[73] Assignee: Ethical Products Inc., Newark, N.J.

[21] Appl. No.: 09/435,378

[22] Filed: Nov. 5, 1999

[51] Int. Cl.[7] .................................................. A01K 5/00
[52] U.S. Cl. .................................................... 119/61
[58] Field of Search ........................... 119/51.01, 51.03, 119/52.1, 61

[56] References Cited

U.S. PATENT DOCUMENTS

| | | | |
|---|---|---|---|
| 1,300,867 | 4/1919 | Pick . | |
| 1,662,171 | 3/1928 | Savery . | |
| 2,601,767 | 7/1952 | Wall | 65/13 |
| 2,720,862 | 10/1955 | Davis | 119/61 |
| 3,498,268 | 5/1968 | Sleith et al. | 119/61 |
| 3,749,063 | 7/1973 | Buffum | 119/61 |
| 4,800,845 | 1/1989 | Budd | 119/61 |
| 4,886,016 | 12/1989 | Atchley | 119/61 |
| 5,000,123 | 3/1991 | Morse et al. | 119/61 |
| 5,069,166 | 12/1991 | Ahuna | 119/61 |
| 5,209,184 | 5/1993 | Sharkan et al. | 119/61 |
| 5,709,168 | 1/1998 | Walker | 119/61 |

*Primary Examiner*—Peter M. Poon
*Assistant Examiner*—Elizabeth Shaw
*Attorney, Agent, or Firm*—Helfgott & Karas, PC.

[57] ABSTRACT

A weighted pet bowl with a minimally small footprint is formed from inner and outer shells stamped from stainless steel sheets. Each shell includes a rim that extends outwardly around the top of the bowl. The rims are crimped together around their outer edges to form a peripheral lip or bead which provides a convenient finger grip for securely gripping the bowl. A flowable material such as sand is provided in an internal cavity defined between the shells to serve as ballast and prevent a pet from tipping over the bowl.

20 Claims, 2 Drawing Sheets

WEIGHTED METAL PET BOWL

BACKGROUND OF THE INVENTION

1. Field of the Invention

The present invention relates in general to pet feeding and watering bowls, and relates in particular to a stamped sheet metal bowl having a minimal footprint and an annular rim formed around its upper edge to provide a convenient gripping surface.

2. Description of Prior Developments

Pet feeding bowls have long been available in a variety of shapes and sizes for holding pet food, water and other solid and liquid materials. Some of these bowls have included weighted portions for stabilizing the bowl, to prevent tipping with resultant spillage, as well as offering resistance to retard sidewards sliding and to generally keep the bowl in a designated floor area, which is frequently identified with a placemat, thereby localizing spillage of liquids such as water and food.

Such conventional bowls are typically made from relatively soft plastic material that is prone to scratching and wear, and thereby become difficult to thoroughly clean. These bowls are also typically difficult to grasp, requiring a pet owner to grasp the sides of the bowl on both the inside and outside side surfaces and potentially contact the solids or liquids held in the bowl.

Accordingly, a need exists for a pet feeding bowl that is highly resistant to scratching and wear and which is easily cleaned.

A further need exists for a pet feeding bowl that is non-allergenic to the muzzle area of a pet's mouth, which is a condition identified with bowls made of certain plastics.

A further need exists for a stamped sheet or metal bowl which takes less floor space, or has a smaller footprint, than a traditional flared pyramidal non-tip bowl, since two bowls, i.e. one for water and one for food, are generally required.

A further need exists for a pet bowl which is easy to grasp and which eliminates the need to grasp the inner sides of the bowl, which need is not addressed by current, non-tip pyramidal bowls.

A further need exists for a pet bowl that is very difficult to tip over as well as economical to manufacture.

The aforementioned objects, features and advantages of the invention will, in part, be pointed out with particularity, and will, in part, become obvious from the following more detailed description of the invention, taken in conjunction with the accompanying drawings, which form an integral part thereof.

SUMMARY OF THE INVENTION

The present invention has been developed to meet the needs noted above and therefore has as an object the provision of a pet bowl formed of a scratch and wear resistant material which is easy to clean and easy to manufacture.

A further object of the invention is the provision of a pet bowl that is easy to grasp and which obviates the need for grasping the inner walls of the bowl.

Another object of the invention is the provision of pet bowl which is non-allergenic to the muzzle area of a pet's mouth, which is a condition identified with bowls made of certain plastics Another object of the invention is the provision of a pet bowl which is weight for stabilizing the bowl, to prevent tipping with resultant spillage, as well as offering resistance to retard sidewards sliding and to generally keep the bowl in a designated floor area.

Another object of the invention is the provision of a pet bowl that is generally extremely difficult to tip over.

Another object of the invention is the provision of a pet bowl that takes less floor space, or has a smaller footprint, than a traditional flared pyramidal non-tip bowl.

These and other objects of the invention are fulfilled by the present invention which is directed to a pet bowl formed of a stainless steel material that is highly resistant to scratching and wear and which is easy to clean. An inner stamped shell is connected to an outer stamped shell by a crimping operation. A rolled or folded over bead or lip is formed on an outer circumferential edge of an annular rim that surrounds the bowl. The bead provides a secure gripping surface and serves to crimp the two shells together.

A ballast or weight material is held in a cavity defined between the inner and outer shells to add weight to the bottom of the bowl. A flowable shape-conforming granular material such as sand serves as the ballast material. An optional liquid, such as water or vegetable oil can be added to the sand to fill in the voids between the sand grains and thereby add further weight to the ballast material.

Because separate inner and outer stamped shells are initially separately and individually stamped in different dies, one of the shells can be embossed and textured while the other shell can remain unembossed and untextured. Various decorative and functional designs can be stamped into either or both of the inner and outer shells.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various views of the drawings, like reference character designate like or similar parts.

DETAILED DESCRIPTION OF THE PREFERRED EMBODIMENTS

Figure 1:
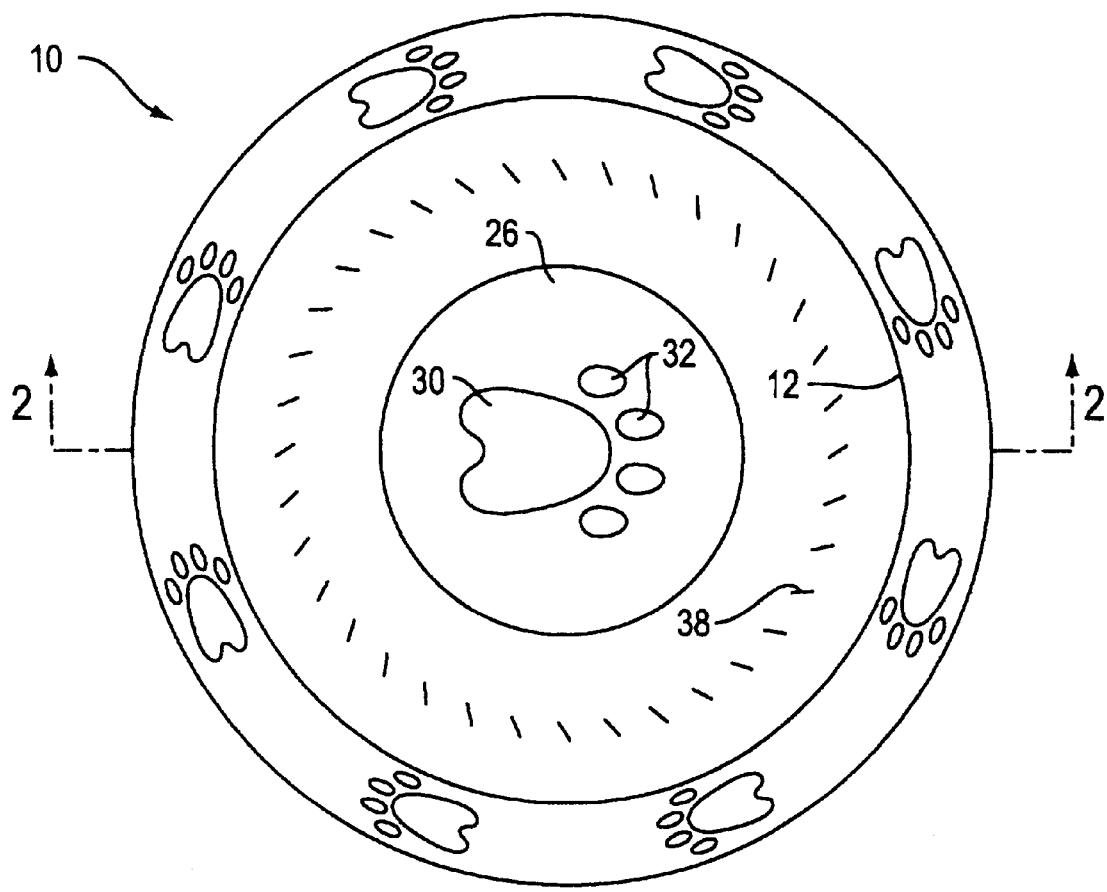
FIG. 1 is a top plan view of a pet bowl constructed in accordance with the invention.
Figure 2:
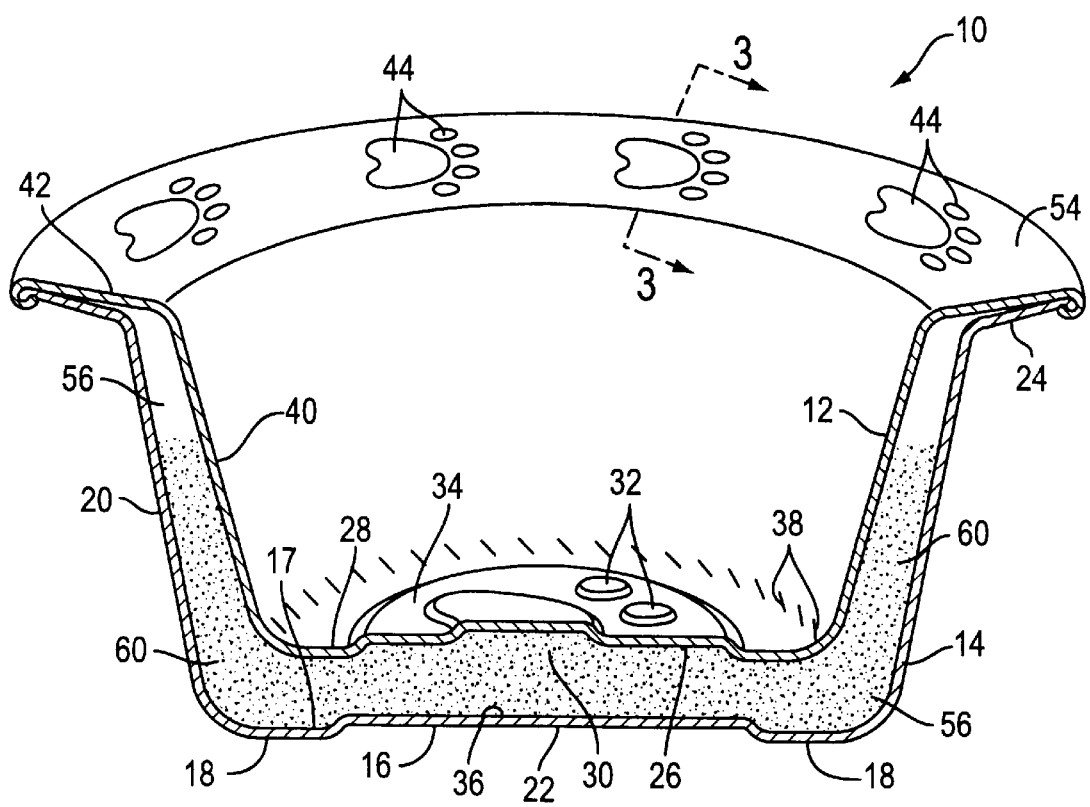
FIG. 2 is a view in section taken along section line 2—2 of FIG. 1.

The present invention will now be described in conjunction with the drawings, beginning with FIGS. 1 and 2 which show a pet bowl 10 constructed in accordance with the invention. The bowl 10 is constructed with an inner shell 12 and an outer shell 14. Each shell is preferably formed of a wear and scratch resistant material such as sheet metal, with the preferred sheet metal being stainless steel sheet metal. The use of metal or sheet metal is also desirable from a hygienic standpoint, since it tends to produce an environment which is non-allergenic to the muzzle area of a pet, which is a problem identified with bowls made from certain plastics. Furthermore, the use of metal bowls is desirable over ceramic bowls, which tend to be prone to breakage even though they also tend to be somewhat heavy or weighty.

The inner and outer shells 12, 14 are advantageously stamped in separate individual molds or dies such that each shell can be formed with its own embossing, designs and textured surfaces. For example, as seen in FIG. 2, a circular recess or depression 16 can be formed in the center of the floor 17 of the outer shell 14 so as to define a substantially flat annular contact surface 18 for resting the bowl on a support surface. Depression 16 also adds strength and rigidity to the entire floor 22 of the outer shell 14.

The outer shell 14 further includes a frustoconical side wall 20 that tapers radially outwardly from the circular floor 22. Side wall 20 extends upwardly to a substantially horizontal annular lip or rim 24. Rim 24 adds strength and rigidity to side wall 20 and provides a convenient gripping surface as discussed in more detail below.

The inner shell 12 can also be formed with a circular recess or depression 26 that, like depression 22, adds strength and rigidity to the floor 28 of the shell. The depressions 22 and 26 are formed in a mold during a stamping operation. In addition to recess 26, another or second depression or recess 30 can be formed in floor 28 during the same stamping operation which forms recess 26.

The additional recess 30, as shown, is stamped into the first circular recess 26 formed in the center of floor 28. The second recess 30 also adds strength and rigidity to floor 28 and recess 30. In addition, the second recess 30 can be formed with a decorative shape or design. As shown in FIG. 1, the second recess 30 is formed as a pad of a dog's footprint and is joined with additional smaller recesses 32 that represent the toes of the footprint.

It should be noted that the first and second recesses 26 and 30 are formed in the inner shell 12 so as to form an upwardly raised surface or plateau 34 on floor 28 which extends toward the top of the bowl 10. A similar upwardly raised plateau 36 is formed on the outer shell 14. However, either or both of the recesses 26 and 30 as well as recess 16 can be formed in the opposite direction such that plateaus 34 and 36 project downwardly away from the top of the bowl 10.

The floor 28 of the inner shell 12 extends outwardly to a curved or radiused corner portion 38 which transitions into a frustoconical side wall 40 which tapers radially outwardly and upwardly away from floor 28. Side wall 40 ends at an annular lip or rim 42 that surrounds the top edge of side wall 40. Rim 42 adds strength and rigidity to side wall 40 and provides a convenient gripping surface around the top of bowl 10.

It should be noted that the design of the inner and outer shells 12 and 14 of the present invention, having side walls that taper radially outwardly from their respective floors, results in a weighted pet bowl having a minimally small footprint, as compared with weighted pet bowls of the prior art. Non-tip bowls are usually characterized by an oversized base, which has a diameter that is larger than the upper diameter or rim of the pet bowl. The weighted pet bowl of the present invention, on the other hand, has substantially straight or slightly tapered side walls, resulting in a base diameter that is equal to or smaller than that of the upper rim. The configuration of the pet bowls of the present invention, therefore, minimizes the footprint of the pet bowl, thereby minimizing the footprint of a set of weighted bowls, where one bowl would be for food and one for water.

Figure 3:
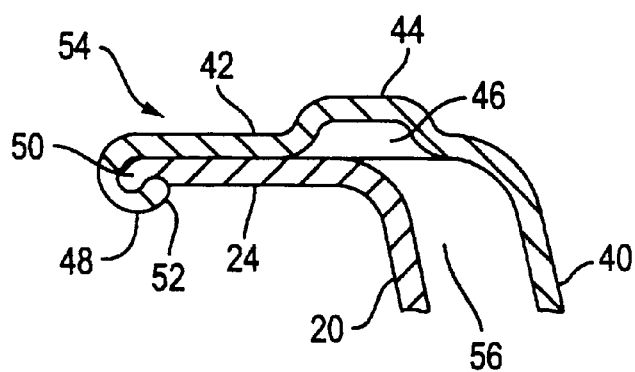
FIG. 3 is an enlarged view in section taken along section line 3—3 of FIG. 2.

The surface of rim 42 may be formed with embossed impressions 44. As shown, impressions 44 are formed in the shape of upwardly raised footprints of a dog. As seen in FIG. 3, only the upper rim 42 on the inner shell is embossed, such that a domed hollow pocket 46 is formed between the upper rim 42 and the lower rim 24 on the outer shell 20. The upwardly extending embossments 44 form a textured outer surface around rim 42, which is both decorative as well as functional. Embossments add strength and rigidity to rim 42 and also provide raised gripping surfaces that aid one in securing a firm grip on the bowl 10.

As further seen in FIG. 3, the upper rim 42 overlies and is crimped around the lower rim 24. The free end portion 48 of the upper rim is curled over and around the free end portion 50 of the lower rim. The free end portion 50 may be bent slightly downwardly to lock the outer end portions 48, 50 securely together. The crimped and rolled over end portion 48 forms a circumferential lip or bead 52 around the outer edge of the free end portion 50.

Bead 52 provides a positive gripping surface around the laminated rim 54 formed by the individual rims 24, 42. Rim 54, which extends transversely of the side walls, is extremely rigid and strong due to its laminated construction.

A hollow cavity or chamber 56 is formed between the inner and outer shells 12, 14. Cavity 56 preferably converges in cross section from the floors 17, 28 up to the rims 24, 42. A flowable or conformable ballast material such as granular material 60 is provided in chamber 56. In the embodiment shown in FIGS. 2 and 4, sand is used for ballast. To add further weight to the ballast, a liquid such as water or vegetable oil 62 can be added to fill the voids between the granular material without affecting its flowability and conformability. In fact, the liquid can improve conformability and flowability.

Figure 4:
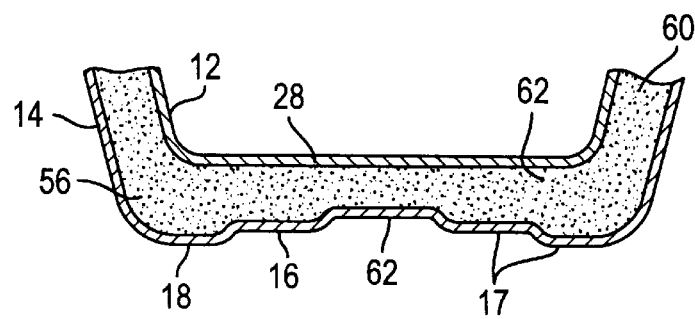
FIG. 4 is a partial view in section, similar to FIG. 2, showing an alternate embodiment of the invention.

An example of an alternate embodiment of the invention is shown in FIG. 4 wherein the floor 28 of the inner shell 12 is formed as a smooth, flat planar surface without embossments. In this example, the flat floor 28 is extremely easy to clean and wipe free of food debris due to the absence of any depressions or projections. The floor 17 on the outer shell 12 is formed with a secondary embossment in the form of second recess 62. Recess 62 may be formed in the shape of a decorative design such as the pad of a dog's footprint, a flower, geometric shape or any other decorative design.

It should be noted that all embossments add strength to the stamped shells 12, 14 and are preferably formed during the same stamping operation which forms stock sheet metal into the hat shaped shells 12, 14. Once the shells 12, 14 are formed, granular ballast material 60 is poured into the bottom of the outer shell 14. The inner shell 12 is then pressed down into the outer shell causing the ballast material to flow and conform to the shape of the chamber or cavity 56 which is defined between the shells. Once the upper rim 42 contacts the lower rim 24, the bowl subassembly is placed in a crimping die and bead or lip 52 is bent and curled over the outer shell rim 24 to complete the assembly.

There has been disclosed heretofore the best embodiment of the invention presently contemplated. However, it is to be understood that the various changes and modifications may be made thereto without departing from the spirit of the invention. For example, bowl 10 need not have a round or annular shape, but can have any shape suitable for stamping or otherwise forming with sheet metal, i.e. rectangular, square, oval, polygonal or irregular.

What is claimed is:

1. A pet bowl, comprising:
    an outer shell having a floor, a side wall and a rim surrounding said side wall;

an inner shell having a floor, an inner side wall and a rim surrounding said inner side wall;

a cavity defined between said inner and outer shells extending from said floors to said rims of said inner and outer shells;

a ballast material provided in said cavity; and a bead formed around said rims on said inner and outer shells, wherein said side walls of said inner and outer shells each comprises a frustoconical side wall tapering outwardly from said respective floors toward said respective rims, and wherein said bead is formed from said rim of said inner shell being crimped around said rim of said outer shell.

2. The bowl of claim 1, wherein said inner and outer shells are formed from sheet metal.

3. The bowl of claim 2, wherein said sheet metal comprises stainless steel.

4. The bowl of claim 1, wherein said ballast comprises sand.

5. The bowl of claim 1, wherein said ballast comprises a liquid.

6. The bowl of claim 1, wherein said rim on said inner shell comprises an embossed surface portion.

7. The bowl of claim 1, wherein said floor of said inner shell comprises an embossed surface portion.

8. The bowl of claim 1, wherein said floor of said outer shell comprises an embossed surface portion.

9. The bowl of claim 1, wherein said floor on said inner shell comprises a smooth flat unembossed floor and said floor on said outer shell comprises a first embossed surface portion.

10. The bowl of claim 9, wherein said first embossed surface portion defines a recess in a central portion of said floor on said outer shell.

11. The bowl of claim 9, wherein said first embossed surface portion on said floor of said outer shell comprises a second embossed surface portion defining a recess in said first embossed surface portion.

12. The bowl of claim 1, wherein said floor on said inner shell comprises a first embossed surface portion and said first embossed surface portion comprises a second embossed surface portion.

13. The bowl of claim 1, further comprising at least one hollow pocket defined between said rims on said inner and outer shells.

14. The bowl of claim 1, wherein said cavity converges in cross section from said floors to said rims.

15. A pet bowl, comprising;

an outer shell having a floor, an outer side wall and an outer rim surrounding said outer side wall;

an inner shell having a floor, an inner side wall and an inner rim surrounding said inner side wall;

a cavity defined between said inner and outer shells; and a laminated rim extending transversely of said side walls and formed by said rim of said inner shell being crimped around said rim of said outer shell, wherein said laminated rim extends transversely beyond said floors of said inner and outer shells.

16. The bowl of claim 15, wherein said laminated rim comprises a bead formed around an end portion on each of said rims on said inner and outer shells.

17. The bowl of claim 15, further comprising a ballast material provided in said cavity.

18. A pet bowl, comprising:

an outer shell having a floor defining a floor footprint, an outer side wall and an outer rim extending transversely from said outer side wall;

an inner shell having a floor, an inner side wall and an inner rim extending transversely from said inner side wall and beyond said outer rim and defining an inner rim footprint; and a cavity defined between said inner and outer shells;

wherein said inner rim footprint is larger than said outer floor footprint.

19. The pet bowl of claim 18, wherein said cavity further comprises a ballast material.

20. The pet bowl of claim 19, wherein said inner rim is crimped around said outer rim.

* * * * *